(12) United States Patent
Burggraf et al.

(10) Patent No.: US 6,804,200 B1
(45) Date of Patent: Oct. 12, 2004

(54) SWITCHING NETWORK FOR HIGH-FREQUENCY SIGNALS

(75) Inventors: Reiner Burggraf, Troisdorf (DE); Wolfgang Kreuz, Bonn (DE); Jürgen Reinert, Bonn (DE); Hans Bremer, Asbach-Bäumenheim (DE)

(73) Assignee: T-Mobile Deutschland GmbH, Bonn (DE)

( * ) Notice: Subject to any disclaimer, the term of this patent is extended or adjusted under 35 U.S.C. 154(b) by 836 days.

(21) Appl. No.: 09/679,655

(22) Filed: Oct. 4, 2000

(30) Foreign Application Priority Data

Oct. 4, 1999 (DE) ......................................... 199 47 654

(51) Int. Cl.[7] .............................................. H04Q 7/34
(52) U.S. Cl. .................................... 370/250; 455/423
(58) Field of Search ............................... 370/250, 251; 455/67.11, 67.14, 423, 424, 425

(56) References Cited

U.S. PATENT DOCUMENTS

| | | | | |
|---|---|---|---|---|
| 5,465,393 A | * | 11/1995 | Frostrom et al. | 455/423 |
| 6,128,474 A | * | 10/2000 | Kim et al. | 455/67.11 |
| 6,438,357 B1 | * | 8/2002 | Oh et al. | 455/67.14 |
| 2002/0119772 A1 | * | 8/2002 | Yoshida | 455/423 |

* cited by examiner

*Primary Examiner*—Melvin Marcelo
(74) *Attorney, Agent, or Firm*—McCormick, Paulding & Huber LLP

(57) ABSTRACT

Tho invention relates to a switching network for connecting at least one high-frequency signal between at least one transceiver and at least one other transceiver.

The switching network according to the invention comprises a first switching stage with at least two similar switching modules for connecting at least one transceiver, the switching modules each having a power splitter and at least one fixed or variable signal attenuator and outputs at which the unattenuated input signal and at least one attenuated input signal are available, a second switching stage with at least one switching module which has at least two inputs downstream of each of which a stepped attenuator is connected and a power splitter which combines the inputs to form a common output signal, and a third switching stage with at least one switching module which comprises a four-pole hybrid coupler with two inputs and two outputs, the outputs having attenuators connected upstream to which at least the other transceiver is connectable, the inputs of the second and third switching stages being connectable as desired, by means of jumpers and/or connection cables, to the outputs of the first and second switching stages.

11 Claims, 3 Drawing Sheets

SWITCHING NETWORK FOR HIGH-FREQUENCY SIGNALS

The invention relates to a switching network for connecting at least one high-frequency signal between at least one transceiver and at least one other transceiver according to the introductory part of Claim 1.

Such a switching network represents a radio link, particularly for the mobile radio sector, and serves to simulate the link for testing mobile radio equipment such as transceivers of mobile radio base stations and mobile radio terminals.

Until now, link simulations have been realized with switching networks discretely constructed for the particular application, and this has necessitated high circuit-assembly costs, especially for the testing of so-called dual band mobile radio terminals operating in both the GSM (900 MHz) and DCS (1800 MHz) frequency bands. Also, the discretely constructed switching networks have not been convenient for users to operate. To simulate the attenuation of the radio signals, interconnected coaxial relays have been used as attenuators. These not only have a certain switching time, but also have limited life. Furthermore, switching from one attenuation value to another has caused a certain radio-signal blackout time which has made readings difficult.

The problem which lies at the basis of the invention is to improve a switching network of the kind stated at the outset, in terms of functionality and ease of operation.

This problem is solved in accordance with the invention by the features stated in the independent claim.

In this solution the switching network comprises: a first switching stage with at least two similar switching modules for connecting at least one transceiver, the switching modules each having a power splitter and at least one fixed or variable signal attenuator and outputs at which the unattenuated input signal and at least one attenuated input signal are available; a second switching stage with at least one switching module which has at least two inputs downstream of each of which a stepped attenuator is connected and a power splittor which combines the inputs to form a common output signal; and a third switching stage with at least one switching module which comprises a four-pole hybrid coupler with two inputs and two outputs, the outputs having signal attenuators connected upstream to which at least the other transceiver is connectable; the inputs of the second and third switching stages being connectable as desired, by means of jumpers and/or connection cables, to the outputs of the first and second switching stages.

The invention affords the advantage that the widest variety of test scenarios can be realized without incurring great expense in terms of circuit assembly. All that is necessary it to interconnect the switching modules as desired by means of jumpers or plug connections. This results in greater convenience of operation. The inputs and outputs of the switching modules are advantageously led to connection sockets located on the front and/or back of the casing. Installation in a standard casing, e.g. a 19" casing, renders the switching network easily transportable, and usable in any location.

In one preferred embodiment of the invention, with a view to augmenting the possible connections and combinations between the switching modules, the switching network is equipped with an additional freely connectable four-pole hybrid coupler with two inputs and two outputs, the outputs of the second switching stage being connectable as desired, via the hybrid coupler, to the inputs of the third switching stage.

Short switching times of the stepped attenuators and long life by comparison with relay-type switching stages can be obtained in accordance with one embodiment of the invention by building the stepped attenuators from semiconductor components. Semiconductor attenuators also allow switching operations to be performed without causing interruptions i.e. without blacking out the signal during switching. This is especially advantageous when carrying out series at readings or runs. Another advantage of semiconductor components is the low overall insertion loss of typically 17 to 25 dB that can be achieved, depending on how the switching modules are connected. This means that signals from very weak signal sources can also be processed.

In another preferred embodiment of the invention, a keyboard fitted to the casing allows direct setting and/or step-adjustment of the attenuation values of the stepped attenuators. This enhances convenience of operation. The attenuation setting can be displayed directly to the operator by a corresponding display device.

According to the invention the switching network is rated for a frequency range of approx. 800–2500 MHz. This large frequency range is achieved through the use of the latest semiconductor components, making it possible for the first time to test dual band or triband mobile radio terminals operating in the 900, 1800 and 2200 MHz range.

According to a development of the invention, signal strength display devices are arranged at the inputs or outputs of the first switching stage; in the simplest (and preferred) case these comprise a high-frequency coupler, a high-frequency rectifier and a comparator circuit or threshold circuit with at least one visual display element for the signal strength. The output with the optimal strength, which is led to the subsequent switching stages, is then easily determined.

The invention will now be described in detail in relation to one embodiment by way of example and with reference to two drawing figures. Further features and advantages of the invention will be apparent from the drawings and their description. In the drawings:

FIG. 1 shows the circuit diagram of a preferred embodiment of the switching network. The switching network according to the invention is designed as a passive system that can be used bidirectionally, that is to say, any signal input in the following description can also be a signal output, and any signal output can be used as a signal input.

Figure 1:
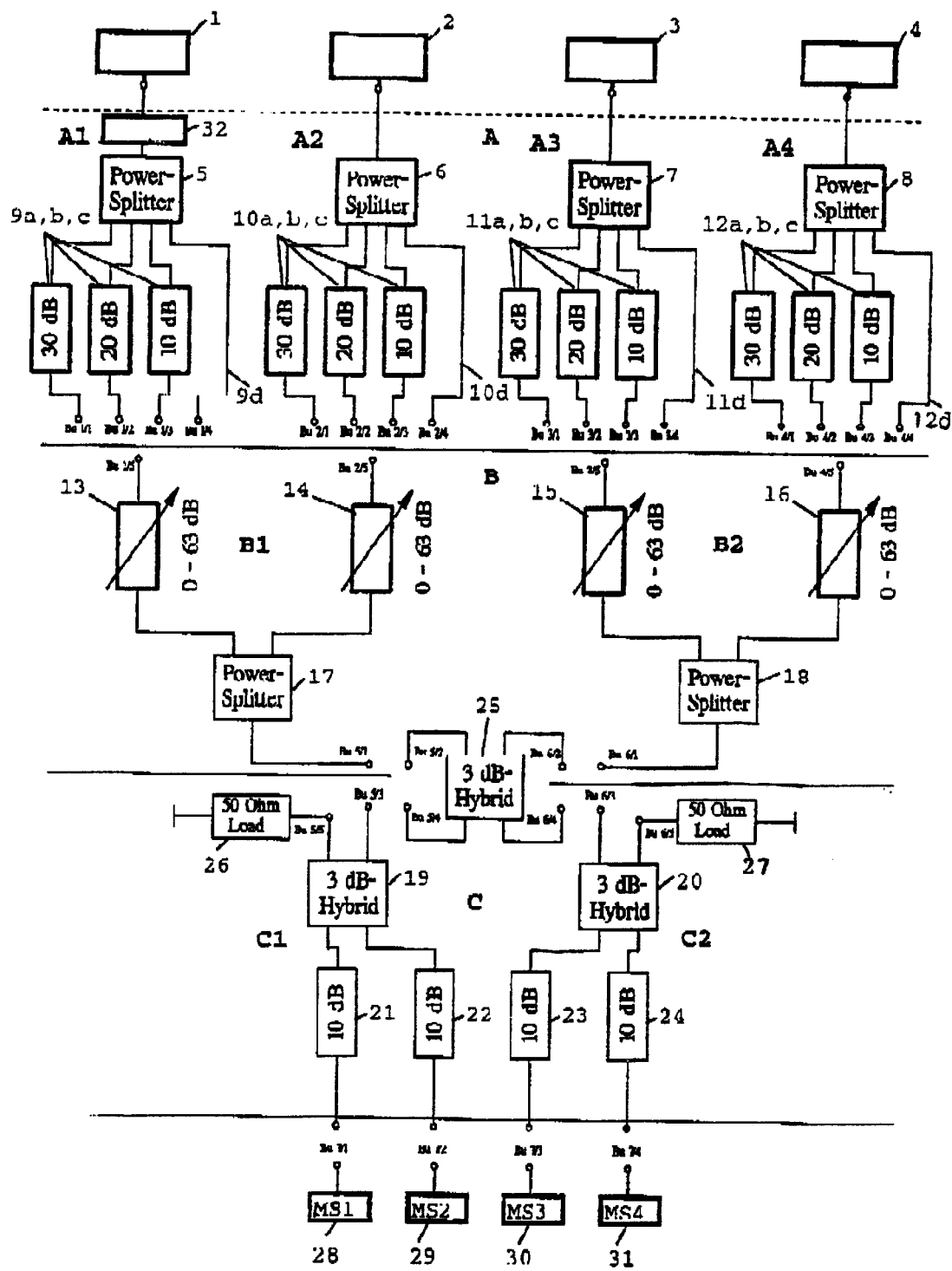
FIG. 1 shows the circuit diagram of a preferred embodiment of the switching network.

It can be seen that there are three basic switching stages A, B and C. Switching stage A comprises for example four identical switching modules A1 to A4; switching stage B comprises two identical switching modules B1, B2; and switching stage C likewise comprises two identical switching modules C1, C2.

A transceiver, in this case a base state 1–4 (BTS) of the mobile radio network, can be connected to the input of each switching module A1–A4. The signal from each base station 1–4 is split by a power splitter 5–8 into four signal branches, of which one signal branch is led directly to an output (e.g. Bu 1/4) of each switching module A1–A4. The other three signal branches have signal attenuators 9a–9c, 10a–10c, 11a–11c, 12a–12c connected downstream, which attenuate the signal by 10 dB, 20 dB or 30 dB. These signals with different levels of attenuation are each lead to an output, e.g. Bu 1/1 to Bu 1/3, etc.

The switching modules B1, B2 of the second switching stage each comprise two inputs, with a stepped attenuator 13, 14 and 15, 16, respectively, constructed from semiconductor material, connected downstream of each input. The stepped attenuators have e.g. a control range of 0–63 dB in steps of 1 dB. The output signals of the stepped attenuators 13, 14 and 15, 16 are brought together by power splitters 17 and 18, respectively, and are respectively fed to outputs 5/1 and 6/1 of the modules B1, B2. The attenuation of each attenuator is controlled by a keyboard on the front panel of the unit.

The switching modules C1 and C2 of the third switching stage each comprise a four-pole hybrid coupler 19 and 20, respectively; each of these couplers has two inputs 5/5, 5/3 and 6/5, 6/3, respectively, and two outputs. Each output from the hybrid couplers 19, 20 is led via an attenuator 21, 22 and 23, 24, respectively, to the outputs Bu 7/1, Bu 7/2 and Bu 7/3, Bu 7/4, respectively, of the switching modules C1, C2. The attenuators have an attenuation of e.g. 10 dB. Another transceiver e.g. in the form of a mobile radio terminal 28–31 can be connected to each output. Two line terminations 26, 27 in the form of 50 ohm loads are provided for optional connection to the hybrid couplers 19, 20.

To augment the possible connections and combinations between the switching modules B and C, the switching network is equipped with a further freely connectable four-pole hybrid coupler 25 with two inputs Bu 5/2; Bu 6/2 and two outputs Bu 5/4; Bu 6/4.

Figure 2:
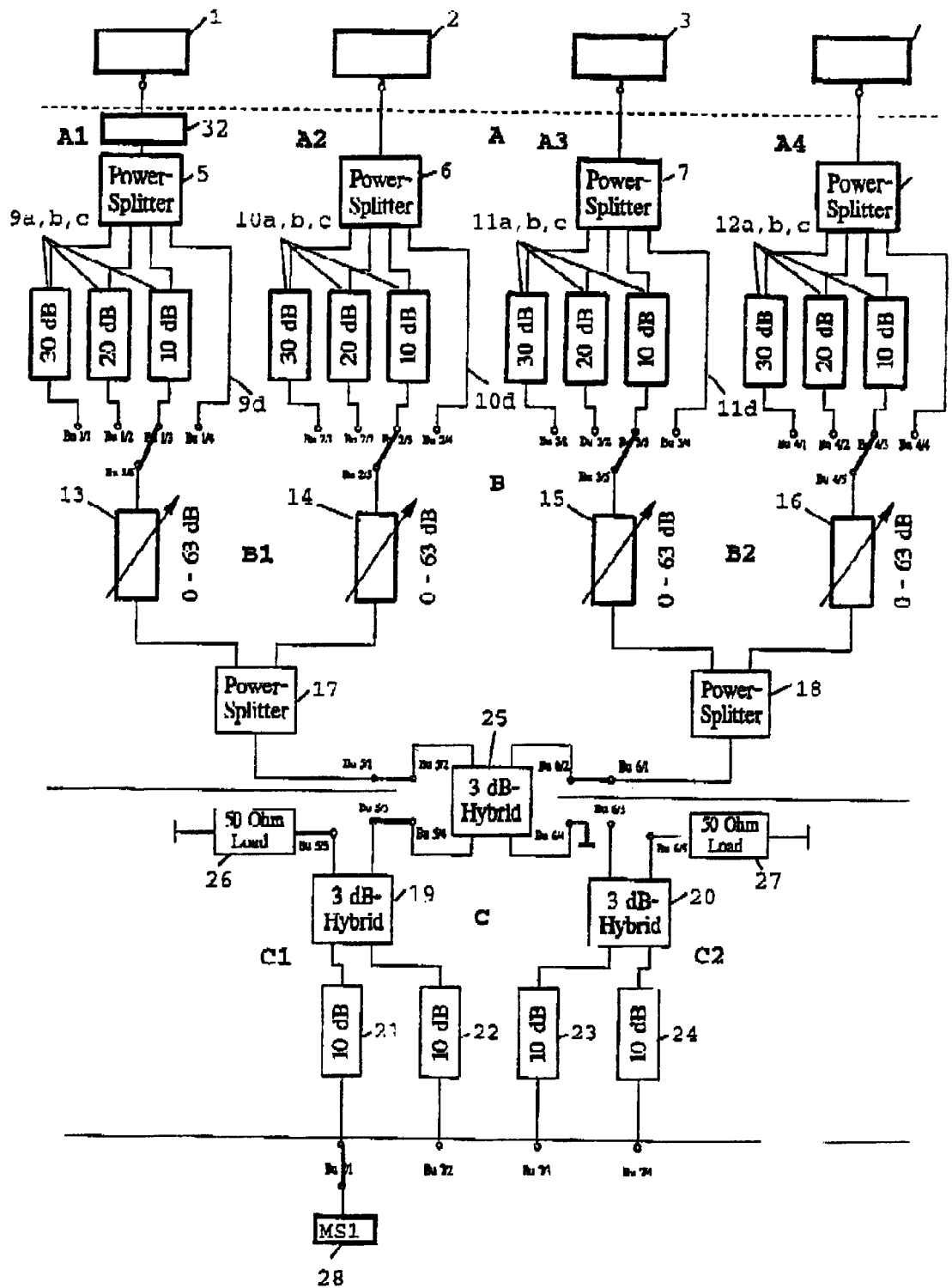
FIG. 2 shows the interconnection of the switching modules for a test link between a mobile radio terminal and four base stations.

FIG. 2 shows an embodiment of the switching network according to the invention in which the switching network of FIG. 1 is wired for a test link between one mobile radio terminal 28 and four base stations 1–4. This set-up can be used for example to test the handover behaviour of the mobile radio terminal 28.

The base stations 1–4 are each connected to a switching module A1–A4, and the 10 dB outputs 1/3, 2/3, 3/3 and 4/3 of the switching modules A1–A4 are connected to the inputs 1/5–4/5 of the switching modules B1 and B2. The outputs 5/1 and 6/1 of the switching modules B1 and B2 are connected to the inputs 5/2 and 6/2 of the hybrid 25 one output 5/4 of which is led to the input 5/3 of the switching module C1. Switching module C2 remains unused. The mobile radio terminal 28 is connected to one output 7/1 of the switching module C1.

By varying the signal strength of the base stations 1–4 by means of the stepped attenuators 13–16 of the switching stages B1 and B2, movement of the mobile radio terminal 28, i.e. a change in the distance from the base stations 1–4, can be simulated to test the handover behaviour of the mobile radio terminal 28. It is also possible e.g. to "misuse" one base station as a jammer to simulate disturbance due to interference.

To obtain a favourable set-up of the necessary measuring dynamics, the switching network contains, in the first switching stage for the individual high-frequency paths, the above-described preattenuation selectable by the user in 10 dB steps (0 dB, 10 dB, 20 dB, 30 dB) which serves to adjust the attenuation range from the entire path. In this embodiment the user of the high-frequency switching network needs to know the transmitting power levels of the connected BTSs in order to make optimum utilization of the control range of the attenuation adjusters of the high-frequency switching network. In the normal situation where the high-frequency attenuation between the device under test and the test location is not precisely known, this means that it will be necessary to measure the transmitting power levels of the connected BTSs by means of power meters or spectrum analyzers.

Figure 3:
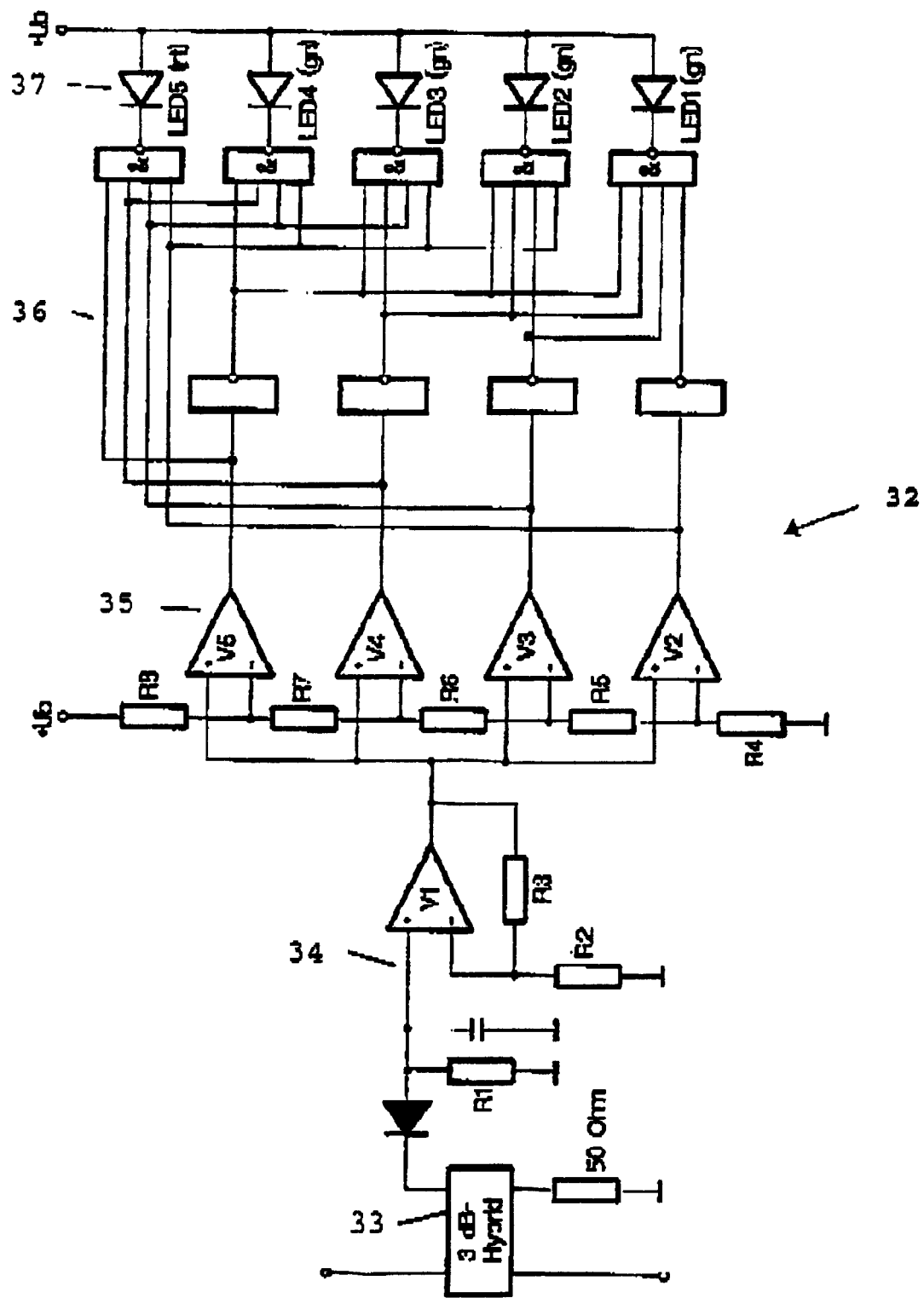
FIG. 3 shows the circuit arrangement for evaluation of signal strength.

In a development of the invention according to FIG. 1 and in particular according to FIG. 3, a signal strength display device 32 is inserted into each of the signal lines between the base stations 1–4 and the power splitters 5–8. Signal strength [display] devices 32 could equally well be located at the unattenuated outputs Bu 1/4, Bu 2/4 etc. of the first switching stage.

By means of these signal strength display devices 32 the user of the high-frequency switching network is given an indication of the optimum preattenuation to be set on the individual attenuation paths, in a simple and inexpensive manner.

As FIG. 3 shows, the high-frequency switching network includes a broad-band high-frequency rectifier 34 for power measurement which is connected e.g. to the input of each attenuation path via a coupler 33 (preferably a 3 dB hybrid) inserted between the individual BTS connection 1–4 and the power splitter 5–8. The output voltage of this high-frequency rectifier 34 is evaluated by means of a comparator circuit 35 followed by a driver circuit 36 for actuating e.g. LEDs 37 so that the LEDs provide a display as follows.

LED 5 (e.g. red) lights up when the input power fed to the high-frequency switching network is too high (overloading). This is an indication to the user that an external (additional) attenuation element must be inserted for this path.

Each of the built-in preattenuation elements e.g. 9a, 9b, 9c, etc, or in other words each output Bu 1/1, Bu 1/2, etc., has an LED (e.g. green) assigned to it in each attenuation path that lights up to indicate to the user, when the BTSx inputs of the high-frequency switching network are being fed with signals below the overload limit, which output of the switching modules Ax should be connected to the respective input Bu 1/5–Bu 4/5 of the switching modules Bx in order to obtain the optimal dynamic range for the switching network.

Here, LED1 is assigned to a preattenuation of 0 dB, LED2 to a preattenuation of 10 dB, LED3 to a preattenuation of 20 dB, and LED4 to a preattenuation of 30 dB.

The switching network according to the invention can be used in a large number of ways, and can be very easily set up for an extremely wide variety of test scenarios.

DRAWING LEGEND

A switching stage
A1 switching module
A2 switching module
A3 switching module
A4 switching module
B switching stage
B1 switching module
B2 switching module
C switching stage
C1 switching module
C2 switching module
1–4 transceiver
5–8 power splitter
9–12 attenuator
13–16 variable attenuator
17, 18 power splitter
19,20 hybrid coupler
21 24 attenuator
25 hybrid coupler
26, 27 line termination 28 31 transceiver
32 signal strength display device
33 high-frequency coupler
34 high frequency rectifier
35 comparator circuit
36 driver circuit
37 LEDs

What is claimed is:

1. Switching network for connecting at least one high-frequency signal between at least one transceiver (1–4) and at least one other transceiver (28–31), characterized in that it comprises:

a first switching stage (A) with at least two similar switching modules (A1–4) for connecting at least one transceiver (1–4), the switching modules (A1–4) each having a power splitter (5–8) and at least one fixed or variable signal attenuator (9–12) and outputs (1/1–1/4) at which the unattenuated input signal and at least one attenuated input signal are available;

a second switching stage (B) with at least one switching module (B1; B2) which has at least two input (Bu 1/5; Bu 2/5) downstream of each of which a stepped attenuator (13–16) is connected and a power splitter (17; 18) which combines the inputs to form a common output signal (Bu 5/1); and a third switching stage (C) with at least one switching module (C1; C2) which comprises a four-pole hybrid coupler (19; 20) with two inputs (Bu 5/3, Bu 5/5) and two outputs, the output (Bu 7/1, Bu 7/2) having attenuators (21–24) connected upstream to which at least the other transceiver (28–31) is connectable;

the inputs of the second and third switching stages (B; C) being connectable as desired, by means of jumpers and/or connection cables, to the outputs of the first and second switching stages (A; B).

2. Switching network according to claim 1, characterized in that it comprises an additional four-pole hybrid coupler with two inputs (Bu 5/2; Bu 6/2) and two outputs (Bu 5/4; Bu 6/4), the outputs of the second switching stage (B) being connectable as desired, via the hybrid coupler, to the inputs of the third switching stage (C).

3. Switching network according to claim 1 or 2, characterized in that the stepped attenuator (13–16) consists of semiconductor components.

4. Switching network according to claim 1, characterized in that the attenuation values of the stepped attenuators (13–16) can be directly set and/or step-adjusted by a keyboard fitted to the casing.

5. Switching network according to claim 1, characterized in that it is rated for a frequency range of 800–2500 MHz.

6. Switching network according to claim 1, characterized in that signal strength display devices (32) are arranged at the inputs or unattenuated outputs (Bu 1/4, Bu 2/4, . . . ) of the first switching stage.

7. Switching network according to claim 6, characterized in that the signal strength display devices (32) comprise visual display elements (37) for displaying one or more different signal strengths.

8. Switching network according to claim 7, characterized in that a signal strength visual display element (37) is assigned to each output (Bu 1/1, Bu 1/2, Bu 1/3, . . . ) of the first switching stage.

9. Switching network according to claim 7, characterized in that signal strength visual display elements (37) are assigned to the inputs (BTSx) of the first switching stage.

10. Switching network according to claim 1, characterized in that the switching modules (A, B, C) are housed in a common portable casing.

11. Switching network according to claim 10, characterized in that the inputs and outputs of the switching modules (A, B, C) are led to connection sockets arranged on the front and/or rear wall of the casing.

* * * * *

UNITED STATES PATENT AND TRADEMARK OFFICE
CERTIFICATE OF CORRECTION

| | | |
|---|---|---|
| PATENT NO. | : 6,804,200 B1 | Page 1 of 1 |
| APPLICATION NO. | : 09/679655 | |
| DATED | : October 12, 2004 | |
| INVENTOR(S) | : Reiner Burggraf et al. | |

It is certified that error appears in the above-identified patent and that said Letters Patent is hereby corrected as shown below:

On the front page, after "(73) Assignee:", insert --MTS Systemtechnik GmbH, Donauworth (DE)--.

Signed and Sealed this

Fifth Day of December, 2006

JON W. DUDAS
*Director of the United States Patent and Trademark Office*